United States Patent [19]
El-Nokaly et al.
[11] Patent Number: 5,045,337
[45] Date of Patent: Sep. 3, 1991

[54] FOOD MICROEMULSION

[75] Inventors: Magda El-Nokaly, Hamilton; George D. Hiler, Harrison; Joseph McGrady, Cincinnati, all of Ohio

[73] Assignee: The Procter & Gamble Company, Cincinnati, Ohio

[21] Appl. No.: 511,154

[22] Filed: Apr. 19, 1990

[51] Int. Cl.[5] .............. A23D 7/00
[52] U.S. Cl. .............. 426/602; 426/601; 426/611; 426/612
[58] Field of Search .............. 426/601, 602, 611, 612

[56] References Cited

U.S. PATENT DOCUMENTS 3,968,169 7/1976 Sieden et al. .............. 568/680

OTHER PUBLICATIONS

Moberger, Lee et al, J. Dispersion Science & Technology 8 (3), 207-215 1987.

*Primary Examiner*—Donald E. Czaja
*Assistant Examiner*—D. Workman
*Attorney, Agent, or Firm*—R. A. Dabek; J. J. Yetter; R. C. Witte

[57] ABSTRACT

Microemulsions which are thermodynamically stable, clear, and homogeneous are made from a polar solvent, a specific polyglycerol mono, diester and a lipid. These microemulsions are edible, have good flavor and can be used to disperse water soluble nutrients, vitamins, flavor and flavor precursors in oils. The polyglycerol mono diester consists of a mixture of mono and diesters of branched or unsaturated fatty acids having from 12 to 24 carbon atoms and a polyglycerol mixture consisting of 0% to 10% monoglycerol and other polyglycerols, 30% or less diglycerol, 25% to 50% triglycerol, 15% to 50% tetraglycerol.

15 Claims, 1 Drawing Sheet

FOOD MICROEMULSION

FIELD OF THE INVENTION

This invention relates to a water in oil microemulsion which is stable, transparent and homogeneous. The microemulsion can be used to solubilize water soluble materials, including flavors, flavor enhancers, flavor precursors, vitamins and minerals in an oil or a liquid/-solid fat composition.

BACKGROUND OF THE INVENTION

Food flavors contain both water soluble and oil soluble components. One of the problems in dispersing a flavor in cooking oils is the solubilization or dispersion of the oil insoluble component into the base product. If the oil insoluble component is volatile it will evaporate on storage. Other methods make heterogeneous solutions which separate or appear cloudy due to the dispersion. One way to add these flavorants or water soluble materials to an oil is through addition of emulsifiers. Emulsions of water and oil are thermodynamically unstable, tend to be milky and separate on standing. As the oil is heated the water evaporates as do the volatile water soluble components.

A specific type of water in oil solubilization which is thermodynamically stable is a microemulsion. Microemulsions are stable, clear liquids which are made of two phases, an oil and a polar solvent (e.g. water) and a surfactant. In many cases a cosurfactant or electrolyte or additional amphiphilic component is required for the formation of a microemulsion.

A clear oil which would contain these water soluble components in a stable form would be very useful. There have been a number of synthetic fuels developed which use vegetable oils and alcohol water solutions. These are formed as microemulsions through the use of high levels of monoglycerides and other co-surfactants. These microemulsions are optically clear, transparent and stable dispersions of oil, water, surfactant and co-surfactant mixed in specific proportions. However, their co-surfactants were unacceptable for food use.

Fat oxidation has been controlled through the use of ascorbic acid and alpha-tocopherol in a microemulsion consisting of soybean oil or sunflower oil, monoglycerides and water. The level of monoglycerides used range from 20% to 65%. This is high for a food product. Lee Moberger et al, *J. Dispersion Science & Technology,* 8 (3),207–215 (1987).

Essential oils have been added to foods and beverages in a microemulsion that uses a surfactant (HLB of 10 to 18) and an alcohol. (See U.S. Pat. No. 4,835,002) to Wolf et al (1989).

U.S. Pat. No. 4,568,480 to Dexheimer (1986) describes alkylated phenol derivatives for making microemulsions.

Accordingly, it would be desirable to provide a means for making water in oil mixtures in which the water was solubilized in the oil, the oil remained transparent or macroscopically homogeneous, and the water remains stable within the oil up to the boiling point of water. In addition, some of the water soluble flavor components remain in the oil when the oil is heated for a longer time than when there is no microemulsion present.

It is an object of this invention to provide such a system through the use of polyglycerol mono-diesters of an unsaturated or branched chain fatty acid having from 12 to 24 carbon atoms. Such a composition would contain up to 10% of the polyglycerol component and 5% water.

It is another object of this invention to make a microemulsion which is free of a co-surfactant, such as an alcohol or acid.

BACKGROUND ART

Thoma and Pfaff, "*Solubilization of Essential Oils with Polyethylene Glyceric Acid Esters,*" Perfumer and Flavorist, 2,27,28 (1978) discloses the use of polyethylene glycol, glyceryl laurate or glyceryl oleate to solubilize lavender oil, anise oil, peppermint oil and oil of clove in water. The ethoxylation of the glycol ranged from 15 to 30. These materials were used for oil in water microemulsions.

Vesala, Rosenholm and Laiho, "*Increasing the Stability of Vegetable Oil Solutions with the Aid of Monoglycerides and a Cosurfactant*", J. Am. Oil Chem. Soc., 62,(9),1379–1385 (1985) describes the formation of microemulsions of water in canola oil. The microemulsions use a monoglyceride (DimodanLS) and a co-surfactant which is an alcohol. Tertiary butyl alcohol works best.

Goering et al, "*Evaluation of Soybean Oil - Aqueous Ethanol Microemulsions for Diesel Engines*", ASAE Publ., N4-82, Vegetable Oil Fuels, 279–86 (1982) describes the evaluation of soybean oil-aqueous ethanol microemulsions for use in diesel fuels. The 1-butanol is a co-solvent. No surfactant is present, therefore this isn't a true microemulsion.

A more detailed study on the engine durability was published in *J. Am. Oil Chem. Soc.,* 61, (10) 1627–1632 (1984).

SUMMARY OF THE INVENTION

Figure 1:
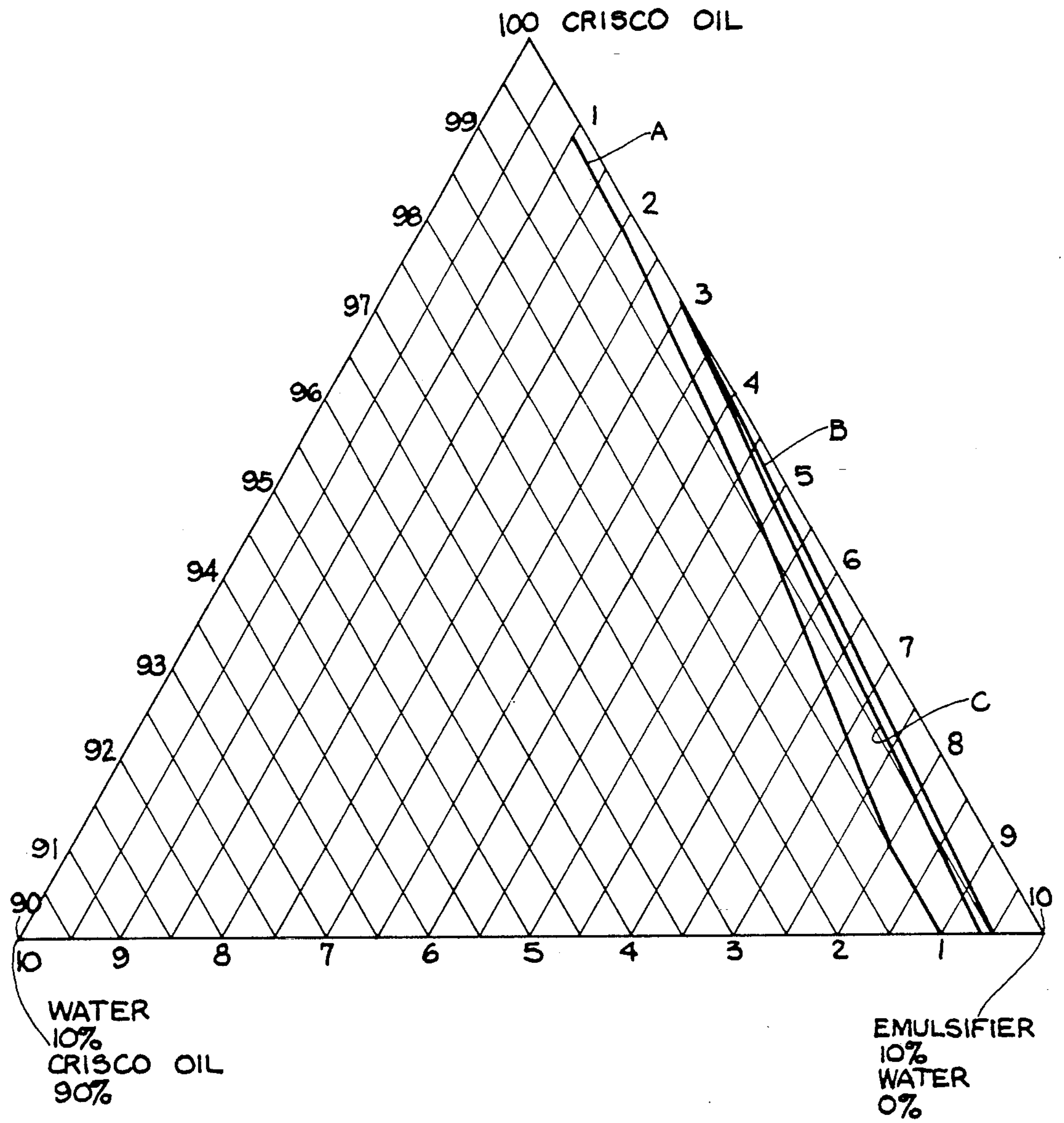
FIG. 1 is a 3 component phase diagram of oil, water and surfactant. The line shows the microemulsion region for three surfactant, oil and water system. These surfactants are a DimodanLS monoglyceride from which the saturates have been removed (line A), polyglycerol mono,di-oleate (line B) and polyglycerol mono,di-linoleate (line C).

A water in oil microemulsion is claimed herein which comprises:

a) from about 90% to about 99.8% lipid;

b) from about 0.1% to about 5% polar solvent; and c) from about 0.1% to about 10% of a polyglycerol mono, diester of an unsaturated or branched chain fatty acid having from 12 to 24 carbon atoms, esterified with a polyglycerol consisting of 30% or less diglycerol, 30% to 50% triglycerol, 15% to 25% tetraglycerol and 0% to 10% glycerol and other polyglycerols.

This microemulsion can be used to solubilize water soluble or oil insoluble materials in the lipid. Such materials include flavorants, flavors, minerals and salts, vitamins, flavor nutrients enhancers and flavor precursors. In addition to these materials other minor additives can be included in the microemulsion. The microemulsion does not require an alcohol, acid or other co-surfactant.

DETAILED DESCRIPTION OF THE INVENTION

As used herein, the term "lipid" includes fats and oils, i.e. naturally occurring or synthetically prepared triglycerides, as well as fat substitutes which have the hydrophobic characteristics of naturally or synthetically occurring fats or oils. Lipid includes vegetable oils, animal fats or oils, marine oils, and polyol polyesters of fatty acids and alcohols as well as polycarboxylic acid polyesters, e.g. Olestra. The lipid used to make the microemulsion must be liquid. The microemulsion can be blended with solid fats to make a liquid, solid fat composition.

As used herein, the term "microemulsion" includes a macroscopically homogeneous or transparent solution of water or other polar solvent in oil which is stable, i.e. does not separate on standing.

As used herein, the term "water soluble material" includes those compositions which are soluble in water and insoluble in the lipid. Water soluble materials include flavors, flavor enhancers, salts, minerals, flavor precursors, sugars, amino acids, vitamins and mixtures thereof.

As used herein, the term "polar solvent" includes water and other water soluble low molecular weight edible glycols and glycerine.

As used herein, the term "polyol" means an organic compound which has at least two hydroxyl groups, for example, a glycol, glycerine, or a sugar alcohol.

As used herein, the term "flavor enhancer" means salts or other materials which enhance the taste impact of a flavor. Flavor enhancers which can be used include sodium chloride, potassium chloride, mixtures of sodium and potassium chlorides and monosodium glutamate, and 5'-nucleotides.

As used herein the term "flavor" or "flavorant" includes artificial or natural flavors. These flavors can be derived from botanical matter such as leaves and seeds or from fruits of plants or they can be extracted or derived from animal materials. Artificial flavors are those which are prepared by chemical synthesis. Preferred water soluble flavorants for adding to a fat or an oil are butter flavors, and herbal flavors such as dill, rosemary, sage or thyme, onion and garlic flavors. Sesame seed and nut flavors can also be added.

As used herein the term "flavor precursor" means those materials which will react with heat to form a flavor. Such ingredients include amino acids and reducing sugars which react in a Maillard reaction to make positive flavors.

As used herein, the term "additives" includes coloring agents, acids or bases to adjust the pH of the system and browning aids. Browning aids include non-fat milk solids, reducing sugars, e.g. fructose, dextrose and mixtures of these sugars, and amino acids. Sugars can also be added to adjust the sweetness of the product. Sugars includes sucrose, honey, fructose, dextrose and sugar alcohols. Artificial sweeteners such as aspartame, saccharin, acesulfam, and related products can also be included.

As used herein, "emulsifier" and "surfactant" are used interchangeably to mean a surface active agent or amphophile which lowers surface and interfacial tension.

Antioxidants such as butylhydroxytoluene (BHT) and butylhydroxyanisole (BHA), can also be added to the microemulsion. Ascorbic acid can also be used. These materials protect the flavor from degrading and the shortening or oil from becoming rancid. Mold and yeast inhibitors can also be added to improve the storage stability of foods to which the microemulsion may be added.

A. Polyglycerol Mono, di-Ester Component

Polyglycerol is essentially a polymer which is formed by the dehydration of glycerine. The preparation of polyglycerol is well known in the art. It can be made by acid or base catalyzed dehydration reaction. In actual practice, polyglycerol usually contains a mixture of molecules that average the specified number of glycerol units. Polyglycerols contain linear and cyclic dimers, trimers and other polymers.

Preferably the polyglycerols used to make the mono, diesters of this invention are mixtures and have an average of about 3 to 3.5 glycerol units, i.e. are made up of mixtures of triglycerols and tetraglycerols and some monoglycerol and diglycerol. The composition of the polyglycerol used herein is very important for obtaining the food microemulsions of this invention. This composition of the polyglycerol is:

30% or less diglycerol
40% to 50% triglycerol
10% to 20% tetraglycerol
0% to 10% glycerol and other polyglycerols.

The most preferred polyglycerol mixture which is used to make the polyglycerol mono, diesters of this invention has the following composition: 30% or less diglycerol, 40% to 50% triglycerol and 15% to 50% tetraglycerol. It is important for this invention to have a mixture of polyglycerols which can act together to lower the interfacial tension of microemulsions against both water and oil continuous solutions thus facilitating the dissolution process.

Polyglycerols can be esterified by reaction with fatty acids in the presence of a catalyst. Esterification can take place at any or all of the hydroxyl groups but generally occurs predominantly at the secondary hydroxyl positions, leaving the terminal hydroxyl group unaffected. Depending upon the reaction conditions and the ratio of fatty acid to polyglycerol, the number of secondary hydroxyl groups which are esterified varies. Polyglycerol esters used herein are primarily those which are mixtures of mono-esters and di-esters of the polyglycerol. The number of hydroxyl groups esterified is obtained by measuring the saponification number in free hydroxyls in the polyglycerol ester mixture. The esters herein have a saponification number of 125 to 150.

The saponification number is defined as the number of milligrams of potassium hydroxide neutralized during saponification of one gram of the ester. The polyglycerols herein comprise from one-third to two-thirds diesters and from one-third to two-thirds monoesters. In other words, one-third monoester means that one-third of the polyglycerol units or moieties are esterified with one fatty acid. One-third diester means that one-third of the polyglycerol moieties are esterified with two fatty acids.

Compositions which meet these criteria are herein referred to as "polyglycerol mono,diesters".

The fatty acid groups can be derived from suitable naturally occurring or synthetic fatty acids and can be unsaturated or branched fatty acids having from 12 to 24 carbon atoms. Examples of preferred fatty acids include oleic acid, linoleic acid, elaidic, and the branched chain $C_{14}$ to $C_{22}$ acids. Particularly preferred are mixtures of oleic acid, linoleic acid and linolenic acids.

While not wishing to be bound by theory, it is believed that the unsaturation, and in particular the polyunsaturation as well as the branching disrupts the formation of liquid crystals or ordered structures. Thus, the polyglycerol mono- and di-esters of this invention make disordered structures as opposed to liquid crystalline structures or very ordered agglomerates or crystals.

It is also theorized that the length of the fatty acid chain which is the hydrophobic end of the molecule is about equal in length to the polyglycerol (the hydrophillic) length of the molecule. It is also theorized that near equal partioning of surfactant between the liquid phases oil and water is needed for optimizing solubilization. This theory is based upon the fact that pure lower polyglycerol esters and longer chain polyglycerol esters do not function to make the microemulsions as used herein. This is evident from the data presented in the following table:

TABLE I

MICROEMULSION FORMATION

| Emulsifier | Commercial Source | Microemulsion (S = Emulsifier) |
|---|---|---|
| Polyoxyethylene (20) sorbitantrioleate | Tween 85 (ICI Americas Inc.) | Not at 10% or less s with 1% water |
| Sorbitan monolaurate | Span 20 (ICI Americas Inc.) | Not at 10% or less s with 1% water |
| Sorbitan monooleate | Span 80 (ICI Americas Inc.) | Not at 10% or less s with 1% water |
| Sorbitan trioleate | Span 85 (ICI Americas Inc.) | Not at 10% or less s with 1% water |
| Polyoxyethylene (10) sorbitan monolaurate | G-7606 J (ICI Americas Inc.) | Not at 10% or less s with 1% water |
| A sorbitan monolaurate | Arlacel 20 (ICI Americas Inc.) | Not at 10% or less s with 1% water |
| Sorbitan monooleate | Arlacel 80 (ICI Americas Inc.) | Not at 10% or less s with 1% water |
| Sorbitan ester | Famodan SMO (Grinsted) | Not at 14% or less s with 1% water |
| Acetylated Mono-glycerides | Cetodan 90-40 (Grinsted) | Not at 14% or less s with 1% water |
| Diacetyl tartaric acid ester of mono/diglycerides | Panodan AB-90 (Grinsted) | Not at 14% or less s with 1% water |
| Succinylated mono-glycerides | From Japan | Not at 14% or less s with 1% water Formed a solid |
| Tetraglyceryl dilaurate | Polyaldo 4-2-L (Lonza) | Not at 12% or less s with 1% water |
| Polyglycerol esters of fatty acids | Triodan 20 (Grinsted) | Microemulsion with 14% s and 1% water but not with less |
| Polyglycerol ester of Dimerised Soybean Oil | Homodan PT (Grinsted) | Did not form a microemulsion at 14% s or less with 1% water |
| Sorbitan Di/Trioleate | AM 493 (Grinsted) | Not at 12% or less s with 1% water |
| Polyoxyethylene (5) sorbitan monooleate | Tween 81 (ICI Americas Inc.) | Not at 10% or less s with 1% water |
| Polysorbate 80 | Tween 80 (ICI Americas Inc.) | Not at 10% or less s with 1% water |
| Triglycerol monooleate | Caprol 360 (Capitol City) | None found |
| Tetraglyceroldioleate | Polyaldo 4-2-0 (Glyco Inc.) | Yes - ratio of (S/Water) ~ 10/0.71 |
| Hexaglyceroldioleate | Caprol 6G20 (Capitol City) | None found |
| Decaglyceroldioleate | Polyaldo 2010 (Glyco Inc.) | None found |
| Polyglycerol-monolaurate with Captex 300 (50/50) | Development Sample #93-919 (Glyco Inc.) | Yes - ratio of (S/Water) ~ 10/0.025 |
| Polyglycerol-monolaurate | | Not at 12% or less s with 1% water |
| Tetraglyceryl laurate | (Grinsted) | Not at 12% or less s with 1% water |

Even if an emulsifier forms a microemulsion at a 12:1 or less ratio of surfactant to water, it does not necessarily mean that as one lowers the water concentration to less than 1% that this same ratio would apply. The ratio of surfactant to water at levels of water below 1% is not linear. Surprisingly, the polyglycerol monodiesters of this invention function at a ratio of 9:1 or less surfactant to water in the range of 0.1% to 1.0% water. A mixture of oleic acid (92%), linoleic acid (5%), stearic acid (2.5%) and palmitic acid (0.5%) was used to esterify a polyglycerol mixture of 10% monoglycerol, 30% diglycerol, 45% triglycerol and 15% tetraglycerol. This mono, diester formed a microemulsion at a ratio of 0.83:1 (surfactant to water, mole:mole) at levels of water in the range of 0.2% to 5%. A polyglycerol mono, dilinoleate mixture functions at a ratio of 0.23:1. FIG. 1 illustrates this. Line B is the mono-dioleate, line C is the linoleate ester.

The particular composition of this invention functions at a much lower ratio of surfactant to water (9:1 or less) than the other surfactants. This allows 0.1% water to be added to an oil without causing any emulsifier off-flavor.

b) The Lipid Component

Triglycerides which can be utilized in the process of the present invention include triglycerides having $C_{12}$ to $C_{26}$ hydrocarbon chains with three fatty acid moieties. These materials can be derived from plants or animals or can be edible synthetic fats or oils. For example, animal fats such as lard, tallow, oleo oil, oleo stock, oleo stearin and like, which are solid at room temperature can be utilized as a mixture with liquid oils. Also, liquid oils, e.g., unsaturated vegetable oils, can be used. These oils can be partially hydrogenated to convert some of the unsaturated double bonds of the fatty acid constituents into saturated bonds. Vegetable oils include soybean oil, hazelnut oil, linseed oil, olive oil, peanut oil, canola oil, safflower oil, rapeseed oil, cottonseed oil and sunflower seed oil can also be used herein.

Also suitable for use herein are the so-called low molecular weight synthetic fats which are certain tri- or diglycerides in which one or two of the hydroxyl groups of the glycerine have been esterified with acetic, propionic, butyric or caprionic acids and one or two of the remaining hydroxyl groups of the glycerine have been esterified with higher molecular weight fatty acids having from 12 to 22 carbon atoms.

Other common types of triglycerides include: cocoa butter and cocoa butter substitutes, such as shea and illipe butter; milk fats, such as butter fat; and marine oils which can be converted into plastic or solid fats such as menhaden, pilcherd, sardine, whale and herring oils.

Many classes of reduced calorie fat, fat-like substances, or mixtures thereof, are suitable for use in the present compositions, to make up part or all of the lipid composition (from 10% to 100%). Medium chain triglycerides, highly esterified polyglycerol esters, polyoxyethylene esters and jojoba esters can be used.

Synthetic oils or fats which have been specifically tailored to provide calorie reduction benefits relative to conventional fats can be used. Of these, especially preferred are reduced calorie fats comprising at least about 15% by weight triglycerides selected from the group consisting of MML, MLM, LLM, and LML triglycerides, and mixtures thereof; wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof.

Other preferred fat-like materials include sucrose polyesters. Solid sucrose, polyesters, and processes for making them, are described in U.S. Pat. No. 4,005,195, Jandacek, issued Jan. 25, 1977, U.S. Pat. No. 3,600,186, Mattson et al., issued Aug. 17, 1971, U.S. Pat. No. 3,963,699, Rizzi et al., issued June 15, 1976, U.S. Pat. No. 4,518,772, Volpenheim, issued May 21, 1985, and U.S. Pat. No. 4,517,360, Volpenheim, issued May 14, 1985.

Sucrose polyesters are fat-like polymers comprising sucrose fatty acid ester compounds that contain four or more fatty acid ester groups which are substantially non-digestible and consequently non-absorbable by the human body. It is not necessary that all of the hydroxyl groups of the sucrose be esterified with fatty acid, but it is preferable that the sucrose contain no more than three unesterified hydroxyl groups, and more preferable that it contain no more than two unesterified hydroxyl groups. Most preferably, substantially all of the hydroxyl groups of the sucrose are esterified with fatty acid, i.e., the compound is substantially completely esterified. The fatty acids esterified to the sucrose molecule can be the same or mixed.

The fatty acids groups esterified to the sucrose molecule must contain from about 8 to about 22 carbon atoms, and preferably from about 14 to about 18 carbon atoms.

Preferred triglycerides include partially hydrogenated and unhydrogenated animal or vegetable oils which are liquid at room temperature.

The lipid component comprises from 90% and 98.8% of the microemulsion. Preferably, the lipid component will be a clear oil with a melting point above room temperature. However, the lipid component can contain solid shortenings and be a solid material, as for example a shortening.

c) Polar Solvent

The microemulsion contains from about 0.1% to about 5% polar solvent. Natural waters as Well as distilled waters can be used. The amount of dissolved minerals or salts in the water will affect the microemulsion and therefore should be included in the calculation of water soluble materials levels. Other polar solvents include glycerine, propylene glycol and dipropylene glycol. Any edible, low molecular weight glycol can be used.

d) Water Soluble Materials

The water soluble materials used in the microemulsion are added to foods for generally flavor or nutritional purposes. Water soluble materials include water soluble vitamins, flavors, flavor enhancers, flavor precursors, trace minerals, and other salts. Any water soluble material can be dispersed in the microemulsion for delivery, including water soluble drugs. An effective amount of flavor is used. This is generally from about 0.01% to about 5%.

The flavors that can be used herein are water soluble flavors. These include both natural and artificial flavors. Suitable water soluble fruit flavors include apple, orange, lemon, banana, pear, pineapple, cranberry and mixtures thereof. Other flavors include salt, rosemary, pepper, and other herbal and spice flavors. Butter flavors, caramel flavors, beef, tallow and other flavors can be used.

The salts that can be used herein include all water soluble salts such as sodium chloride, potassium chloride, salts of amino acids such as monosodium glutamate, sodium aspartate, as well as salts of other organic acids such as sodium citrate, sodium or potassium, acetate, etc. Any alkali metal salt of amino acids or organic acids can be used herein. These include calcium, potassium, sodium, magnesium and lithium.

In addition, trace minerals can be added as their salts. These would include copper, manganese, zinc, calcium, iron, chromium, and magnesium. These salts may be used with anions such as carbonate, sulphate, nitrate, acetate, citrate, malate or tartrate. In addition, the minerals can be added as water soluble complexes for example, calcium citrate malate or a tartrate, calcium orotate or aspartate, or calcium lactate. Suitable iron sources include ferrous glutamate, ferrous fumarate, ferrous sugar organic carboxylates (as for example disclosed in Nakel et al, U.S. Pat. No. 4,758,510).

Sugars can also be included. These include the monosaccharides as well as disaccharides or water soluble polysaccharides. Particularly preferred for use herein are fructose, glucose, high fructose corn syrup, maltose, lactose, maltose syrups, refiners sugar, sucrose, and mixtures thereof. The sugar alcohols can also be used in these compositions, including sorbitol and mannitol.

The water soluble vitamins can also be used. These include vitamin C (ascorbic acid) as well as the B vitamins and other water soluble vitamins.

Flavorants such as citric acid or acetic can also be used. Antioxidants such as ascorbic acid can also be added to the microemulsion.

Flavor precursors and flavor potentiators can be added. These include furanone, cysteine, methionine, methionine sulfoxide, methionine derivatives and 5'-nucleotides. Other amino acids and amino acid derivations can be included. Water soluble enzymes can also be added to oils using this microemulsion.

PREPARATION OF THE MICROEMULSION

The water soluble materials are preferably dissolved in the water or polar solvent. The lipid, water, and polyglycerol mono or diesters, are then mixed together. The formation of the microemulsion is independent of the order of the addition of the components. The lipid materials should be heated to dissolve any solid lipid or fat crystals. The microemulsion forms spontaneously and equilibrium is reached very quickly particularly if the polyglycerol mono, diester of this invention is added to lipid and then the polar solvent is added. Hand shaking or vibromixing is sufficient to form the microemulsions. Ambient temperatures are acceptable for the preparation of these compositions. In the case where the lipid is heated, then the mixing of the polar solvent/water soluble materials and lipid would be conducted at these higher temperatures.

Once the microemulsion is formed it does not separate on standing or cooling.

The following examples illustrate the invention, but are not intended to be limiting thereof:

EXAMPLE I

| Ingredient | Percent |
|---|---|
| Crisco Oil | 90 |
| Polylglycerol Mono and di-linoleate | 9 |
| Butter - Flavor Aqueous Solution | 1 |

Crisco Oil is a soybean oil available from the Procter & Gamble Company.

The polyglycerol is esterified with sunflower oil which is predominantly linoleic acid (68.9% linoleic acid and 18.2% oleic acid, 4.7% stearic and 7.1% palmitic and 0.8% higher fatty acids). The polyglycerol has the following composition: 30% diglycerol, 45% triglycerol and 15% tetraglycerol and 10% glycerol. The saponification number is 138. One-third of the composition is monoesters and two-thirds is diesters.

The water soluble butter flavor is dissolved in water and then added to Crisco Oil and the polyglycerol mono, diester. This mixture is shaken by hand at room temperature for several minutes time. A transparent butter flavored oil is formed.

EXAMPLE II

Microemulsions similar to Example I are made with the following additives. All of these compositions are stable and can be used for salads or cooking and frying.

| Water Soluble Material | Amount in Oil |
|---|---|
| Fructose | 5,000 ppm |
| 3-hydroxy-4,5-dimethyl-2 (5H)-furanone (Furaneol ®) | 10 ppm |
| Caramel Furanone | 100 ppm |
| Cysteine | 50 ppm |
| Ribotide | 1000 ppm |
| Methionine sulfoxide | 100 ppm |
| Cyclotene | 100 ppm |

Barbecue flavor, catsup spice flavor, artificial beef flavor, and honey can be added to an oil at levels of 10 ppm to 5000 ppm and similar results are obtained.

What is claimed is:

1. A water and oil microemulsion consisting of:

A) from about 90% to about 99.8% lipid

B) from about 0.1% to about 5% polar solvent; and

C) from about 0.1% to about 10% of a polyglycerol mono, diester of an unsaturated or branched chain fatty acid having from 12 to 24 carbon atoms, said polyglycerol consisting of a mixture of 0% to 10% monoglycerol and other polyglycerols, 30% or less diglycerol, 30% to 50% triglycerol and 15% to 50% tetraglycerol.

2. A microemulsion according to claim 1 wherein said polar solvent is water or glycerol.

3. A water and oil microemulsion consisting of:

A) from about 90% to about 99.8% lipid,

B) from about 0.1% to about 5% polar solvent,

C) from about 0.1% to about 10% of a polyglycerol mono, diester of an unsaturated or branched chain fatty acid having from 12 to 24 carbon atoms, said polyglycerol consisting of a mixture of 0% to 10% monoglycerol and other polyglycerols, 30% or less diglycerol, 30% to 50% triglycerol and 15% to 20% tetraglycerol, and D) from about 0.01% to about 5% water soluble material.

4. A microemulsion according to claim 3 wherein said unsaturated fatty acid is selected from the group consisting of oleic acid, linoleic acid, linolenic acid and mixtures thereof.

5. A microemulsion according to claim 4 wherein said polyglycerol ester has a saponification number of from 125 to 150.

6. A microemulsion according to claim 5 wherein said water soluble material comprises a flavor, flavor enhancer, sugar or mixtures thereof.

7. A microemulsion according to claim 6 wherein said lipid is selected from the group consisting of vegetable oils, animal oils and polyol polyesters.

8. A microemulsion according to claim 7 wherein said vegetable oil is selected from the group consisting of canola oil, corn oil, soybean oil, hydrogenated soybean oil, cottonseed oil, hydrogenated cottonseed oil, rapeseed oil, safflower oil, sunflower oil and mixtures thereof.

9. A microemulsion according to claim 7 wherein said water soluble material comprises a water soluble butter flavor.

10. A microemulsion according to claim 7 wherein said water soluble material is selected from the group consisting of mineral salts, vitamins, and mixtures thereof.

11. A microemulsion according to claim 7 wherein said mineral salts are selected from the group consisting of calcium citrate, calcium malate, calcium tartrate, calcium lactate, calcium oratate, calcium aspartatese, ferrous glutamate, ferrous sucromalate, ferrous sulphate, copper sulphate, and mixtures thereof.

12. A microemulsion according to claim 7 wherein said polyol polyesters is selected from the group consisting of sucrose hexaesters, sucrose heptaesters and sucrose octaesters of alkyl saturated and unsaturated fatty acids having from 12 to 22 carbon atoms.

13. A microemulsion according to claim 1 wherein said polyglycerol mono-diester is derived from a polyglycerol having 30% or less diglycerol, 45% triglycerol, 15% tetraglycerol and 10% glycerine.

14. A microemulsion according to claim 13 wherein said polyglycerol ester is an ester of linoleic acid.

15. A microemulsion which is substantially free of co-surfactants consisting of:

A) from about 90% to about 99.8% lipid,

B) from about 0.1% to about 5% polar solvent,

C) from about 0.1% to about 10% of a polyglycerol mono, diester of an unsaturated or branched chain fatty acid having from 12 to 24 carbon atoms, said polyglycerol consisting of a mixture of 0% to 10% monoglycerol and other polyglycerols, 30% or less diglycerol, 30% to 50% triglycerol and 15% to 20% tetraglycerol.

* * * * *